United States Patent Office 3,250,735
Patented May 10, 1966

3,250,735
THIXOTROPIC AQUEOUS EMULSION CONTAINING POLYISOBUTYLENE AND BETA-PINENE POLYMER
William A. Higgins, Cleveland, Ohio, assignor to The Lubrizol Corporation, Wickliffe, Ohio, a corporation of Ohio
No Drawing. Filed Mar. 29, 1962, Ser. No. 183,393
5 Claims. (Cl. 260—29.6)

This application is a continuation-in-part of copending application Serial No. 716,278 filed February 20, 1958 and now abandoned.

This invention relates as indicated to emulsions of polymeric terpenes. It relates more particularly to thixotropic aqueous emulsions containing substantial amounts of solid polymers of beta-pinene.

The emulsions of this invention have been found to be useful in the application of weather-proof coatings to roof surfaces and exterior walls. They are especially useful for the latter purpose because of the thixotropic nature of the emulsions which allows their application in high film thickness even by spraying. Roof surfaces and exterior walls which have previously been covered with asphaltic materials are especially susceptible to the weather-proofing afforded by the residue from the emulsions described herein.

The deterioration of exterior protective coatings caused by sunlight poses a serious maintenance problem, and it is necessary to provide protection to such exterior surfaces from the harmful effects of the ultra-violet components of sunlight if such exterior surfaces are to be preserved for any reasonable length of time. Such protection depends for the most part upon the concentration of chemicals in any protective coating which have the property of absorbing or reflecting ultra-violet radiation. To assure a sufficiently high concentration of such chemicals the advisability of applying several coats of paint is evident.

It is accordingly a principal object of this invention to provide novel compositions of matter.

Another object of the invention is to provide thixotropic aqueous emulsions which are useful in the application of protective coatings for exterior surfaces.

Another object of the present invention is to provide inexpensive protection to exterior surfaces from the harmful effects of ultra-violet radiation.

Still another object of the present invention is to provide decorative coating compositions for application to exterior bituminous surfaces.

These and other objects of the invention are provided by an aqueous emulsion which comprises a mixture of polyisobutylene, a polymer of beta-pinene, and clay. In a more particular sense these objects are achieved by an aqueous emulsion comprising 25 parts of polyisobutylene having a molecular weight within the range of 500 to 2,000, from about 25 to about 75 parts of a solid polymer of beta-pinene, from about 2 to about 10 parts of clay, and from 0.01 to 0.10 parts of a flocculating agent.

For most applications and in order to best provide the degree of protection referred to above the emulsions of this invention will contain also an appreciable amount of a pigment. They may contain also an appreciable amount of "extenders" which have the effect of providing an enhanced effectiveness to the pigments together, of course, with reduced cost. The most commonly used pigment for the purposes of this invention has been titanium dioxide so that the resultant emulsion is in fact a white paint. The further incorporation of minor amounts of various dyes or pigments makes available a complete range of colored paints from the aqueous emulsions of this invention. For the purposes of describing this invention the term "pigment" is employed broadly to denote the combination of a particular pigment and any extenders which are used therewith.

One especially valuable feature of such pigmented emulsions is the degree of decoration and protection afforded exterior surfaces by the residual film resulting from the application of such emulsions to the surfaces. The peculiar property of these emulsions of adhering firmly and permanently to bituminous surfaces makes them useful as paints which can impart to such bituminous surfaces a high degree of decoration and protection from the ravages of weather. It will be appreciated that a light colored surface resulting from the application of such a pigmented emulsion to a black asphalt roof will reflect a large proportion of the ultra-violet rays from the sun and thus provide not only decoration and protection but a large measure of comfort with respect to the internal temperature of the building beneath such a roof surface.

The preparation of these aqueous emulsions is best effected by dispersing the required amount of clay in water, agitating this slurry thoroughly, adding a small amount of one or more flocculating agents, and then adding a melted mixture of the polyisobutylene and polymeric beta-pinene to the agitated dispersion. The resultant is a thixotropic emulsion which upon application to a firm surface yields a translucent, almost transparent residual film. This film affords protection to exterior surfaces from snow and rain, and is valuable for such purposes because of its tenacious attachment to asphaltic surfaces. It does not, however, provide a maximum protection from ultra-violet radiation and such protection may be acquired only by the incorporation into the aqueous emulsion of a pigment such as titanium dioxide.

The incorporation of a pigment into the emulsion may be effected either by adding the solid pigment together with any extenders directly to the emulsion are prepared above, or alternatively, the over-all pigmented emulsion may be prepared by formulating first a clay-titanium dioxide slurry, and then introducing into this agitated slurry a thin stream of a solution of the polymerized beta-pinene in the polyisobutylene.

The polyisobutylene used for the purposes of this invention is preferably one prepared by the aluminum chloride-catalyzed polymerization of isobutylene at a temperature within the range of 0° C. to about 25° C. Such polymerization is carried out by adding aluminum chloride to isobutylene at 0° C. and cooling the resulting exothermic polymerization mixture by external means. The temperature of such a polymerization mass rises as the polymerization proceeds to about 25° C. The molecular weight of the polymer prepared in this fashion is about 900. Higher or lower molecular weight polyisobutylenes likewise are satisfactory in the formulation of the emulsions of this invention although it is preferred to use such polymers which have molecular weights within the range of 500 to 2000. The use of polyisobutylenes having a molecular weight greater than 2,000 in the emulsion of this invention results in a product which provides a relatively unsatisfactory protective coating for exterior surfaces because it tends to get dirty. Preparation of the polyisobutylene may be effected also by catalysts other than aluminum chloride, and these include principally boron trifluoride and the various complexes of boron trifluoride with water, ethers, etc. Copolymers of isobutylene are also useful in the emulsions of this invention although such copolymers should contain a preponderance of isobutylene units so that the copolymers are polymers primarily of isobutylene. Such copolymers for example are those prepared from a 90–10 mixture of isobutylene and styrene, a 95–5 mixture of isobutylene and butadiene, etc.

The solid polymer of beta-pinene which is used in the emulsions of this invention is prepared by the ionic polymerization of beta-pinene. The catalyst used may be aluminum chloride, boron trifluoride, sulfuric acid, phosphoric acid, etc., but it is preferred to employ polymers which are prepared by the sulfuric acid-catalysed polymerization of beta-pinene. Such polymers may be prepared by mixing one part by weight of concentrated sulfuric acid with 99 parts by weight of beta-pinene and heating the agitated mixture until the exothermic polymerization begins. The resulting polymers is a light yellow material ranging from a viscous liquid to a hard solid. Formulation of the emulsions of this invention require the use only of the polymers of beta-pinene which have a ring and ball softening point (ASTM D36–26) of greater than 30° C., and preferably those which have a ring and ball softening greater than 75° C.

The clay component is preferably bentonite clay although other surface active clays are suitable. In general, the montmorillonite clays are satisfactory for use as the clay component because of the high base exchange capacity of the clays so designated. This high base exchange capacity is in turn associated with high plasticity, drying, shrinkage, and bonding power. All of these properties are desirable in clays which are to be used in the compositions of this invention. Clays other than the montmorillonite clays are in some instances also useful. Thus kaloin, although it is classed with the kaolinite clays which are known to have relatively low base exchange capacities, is suitable in some cases.

The "flocculating" agents contemplated herein include principally the polyvalent metal inorganic salts and in some cases low molecular weight carboxylic acids, particularly acetic acid. Copper sulfate, potassium dichromate, aluminum sulfate, sulfuric acid, etc., are specific examples of suitable flocculating agents. In many cases it is desirable to use a combination of two or more of such flocculating agents. A suitable description of materials which may be used as flocculating agents is found on page 396 of McBain's "Colloid Science," published by Heath in 1950. It should be noted that the quantities of flocculating agents used in the compositions of this invention are less than those ordinarily used to accomplish flocculation of the clay and are such as to produce a viscous, almost gel-like structure.

With respect to the relative proportions of each of the other ingredients found in the aqueous clay emulsions it is important to note that the polyisobutylene component appears to act as a plasticizer so that less than the minimum amount indicated above results in a product which is brittle, whereas the use of more than the stated maximum amount gives a product which is characterized by tackiness. It is important also that the indicated range of concentration of clay in the emulsion be observed carefully inasmuch as the use of less than the stated minimum amount of clay results in an emulsion which is not satisfactorily stable. Such emulsions may in fact possesses a pronounced tendency to settle into aqueous and organic layers. Furthermore they may also be characterized by a lack of the thixotropic quality which enhances the value of the compositions of this invention. The use of more clay than the indicated maximum, on the other hand, results in emulsions which yield residual films having a strong tendency to develop cracks, thus markedly reducing their value as protective coatings.

The amount of pigment used in the formulations of these emulsions may be varied within the range of from about 20 to about 75 parts of pigment per 50 parts of combined polyisobutylene and polymeric beta-pinene. As indicated hereinbefore the term "pigment" is used to denote the combination of a particular pigment and any extenders used therewith. Thus a typical pigmented emulsion of this invention will include the following:

| | Parts |
|---|---|
| Polyisobutylene of molecular weight 900 (prepared by the aluminum chloride-catalyzed polymerization of isobutylene) | 25 |
| Polymer of beta-pinene having a melting point of 100° C. (prepared by the sulfuric acid-catalyzed polymerization of beta-pinene) | 25 |
| Bentonite clay | 5 |
| Water | 100 |
| Titanium dioxide | 30 |
| Talc | 11 |
| Mica | 7 |
| Diatomaceous earth | 13 |

All parts herein are parts by weight.

The invention may be illustrated in detail by the following examples:

Example 1

A slurry of 5 parts of bentonite clay in 45 parts of water was prepared, heated to 170° F. and treated with 0.21 part of an aqueous solution containing 8% of potassium dichromate and 8% of acetic acid, then with 0.112 part of glacial acetic acid. The pH of the resulting slurry was 6.3. A warm (270° F.) mixture of 33 parts of polymerized beta-pinene (having a ring and ball softening point of 100° C.) and 17 parts of polyisobutylene having an average molecular weight of 750 was added to this slurry. To the resulting emulsion there was added 0.08 part of the copper sulfate pentahydrate. The mixture was stirred at 120° F. for 8 hours to yield a cream-like emulsion.

Example 2

Twenty-nine parts of a 10% aqueous clay (benetonite) slurry was treated at 150° F. with 0.105 part of an aqueous solution containing 8% potassium dichromate and 8% of acetic acid, then with 0.056 part of glacial acetic acid. To this slurry there was added 28.6 parts of a mixture (heated to 250° F.) of 2 parts of polymerized beta-pinene having a ring and ball softening point of 100° C. and 1 part of polyisobutylene having an average molecular weight of 750. The resulting emulsion was stirred for an hour then cooled and treated with 14.3 parts of titanium dioxide, and 28 parts of water to yield a white viscous emulsion.

Example 3

To 410 grams of a 7% aqueous slurry of bentonite clay there was added with stirring 13.5 ml. of an aqueous solution containing 0.8% potassium dichromate and 0.8% acetic acid, 4.6 ml. of 10% acetic acid and 3.3 ml. of a 10% aqueous solution of copper sulfate pentahydrate. To the resulting slurry there was added 249.6 grams of titanium dioxide, 96.3 grams of talc, 60.6 grams of mica, 110.5 grams of diatomaceous earth and 445.7 grams of water. To this pigmented slurry was added 410 grams of a 1.25:1 mixture of polymerized beta-pinene having a ring and ball softening point of 100° C. and polyisobutylene having an average molecular weight of 900. The resulting product was a white emulsion.

Other modes of applying the principle of the invention may be employed, change being made as regards the details described, provided the features stated in any of the following claims or the equivalent of such be employed.

I, therefore, particularly point out and distinctly claim as my invention:

1. A thixotropic aqueous emulsion consisting essentially of 25 parts of polyisobutylene having a molecular weight within the range of 500 to 2000, from about 25 to 75 parts of a solid polymer of beta-pinene having a softening point above 30° C., from about 2 to about 10 parts of a montmorillonite clay, and from about 0.01 to 0.50 part of a flocculating agent.

2. The emulsion of claim 1 characterized further in that the clay is bentonite.

3. The emulsion of claim 1 characterized further by the presence of from about 25 to about 75 parts of a pigment per 50 parts of combined polyisobutylene and polymeric beta-pinene.

4. A thixotropic aqueous emulsion consisting essentially of 25 parts of polyisobutylene having a molecular weight of about 900, from about 25 to 75 parts of a solid polymer of beta-pinene having a softening point about 30° C., from about 2 to 10 parts of bentonite clay, from 0.01 to 0.50 part of a flocculating agent, and from about 50 to about 70 parts of titanium dioxide.

5. The emulsion of claim 4 characterized further in that the solid polymer of beta-pinene has a melting point greater than 75° C.

References Cited by the Examiner

UNITED STATES PATENTS

| | | | |
|---|---|---|---|
| 2,349,508 | 5/1944 | Mack | 260—29.8 |
| 2,370,057 | 2/1945 | Mack | 260—29.6 |
| 2,692,245 | 10/1954 | Grooves et al. | 260—29.6 |

FOREIGN PATENTS 873,452  7/1961  Great Britain.

OTHER REFERENCES

Rose, "The Condensed Chemical Dictionary" (Fourth Edition 1950), 1956, page 878, Reinhold Pub. Co., New York.

Marchionna, "Butalastic Polymers," Reinhold Pub. Company, New York, 1946, page 417.

McBain, "Colloid Chemistry," published by Heath and Company, Boston, 1950, page 396.

Fischer, "Colloidal Dispersions," 1950, published by John Wiley and Sons, New York, pages 182–190.

JOSEPH L. SCHOFER, *Primary Examiner*.

LEON J. BERCOVITZ, *Examiner*.